US007295584B2

(12) United States Patent
Ahmadvand et al.

(10) Patent No.: US 7,295,584 B2
(45) Date of Patent: Nov. 13, 2007

(54) SYSTEM AND METHOD FOR GENERATING MULTI-WAVELENGTH LASER SOURCE USING HIGHLY NONLINEAR FIBER

(75) Inventors: Nima Ahmadvand, Ottawa (CA); Jidong Xu, Gloucester (CA); Jie Sun, Ottawa (CA); Hanwu Hu, Ottawa (CA); Qi Yang Peng, Ottawa (CA)

(73) Assignee: Peleton Photonic Systems, Kanata, Ontario (CA)

( * ) Notice: Subject to any disclaimer, the term of this patent is extended or adjusted under 35 U.S.C. 154(b) by 460 days.

(21) Appl. No.: 10/613,033

(22) Filed: Jul. 7, 2003

(65) Prior Publication Data

US 2004/0032887 A1   Feb. 19, 2004

Related U.S. Application Data

(63) Continuation-in-part of application No. 10/015,753, filed on Dec. 17, 2001, now Pat. No. 6,826,207.

(51) Int. Cl.
*H01S 3/13* (2006.01)
*H01S 3/00* (2006.01)
(52) U.S. Cl. .......................................... 372/28; 372/32
(58) Field of Classification Search .................. 372/6, 372/21–22, 28–32; 385/123–128; 359/341; 398/152
See application file for complete search history.

(56) References Cited

U.S. PATENT DOCUMENTS

| | | | | |
|---|---|---|---|---|
| 4,989,201 A | | 1/1991 | Glance ........................... 370/3 |
| 5,015,054 A | * | 5/1991 | Chaffee ........................ 385/27 |
| 5,028,889 A | | 7/1991 | Fedan ........................ 331/183 |
| 5,256,968 A | | 10/1993 | Loualiche et al. ............. 324/96 |
| 5,434,701 A | | 7/1995 | Fatehi et al. ................ 359/341 |
| 5,532,868 A | * | 7/1996 | Gnauck et al. ............. 359/332 |
| 5,537,243 A | | 7/1996 | Fatehi et al. ................ 359/541 |
| 5,564,832 A | | 10/1996 | Ball et al. .................... 374/161 |
| 5,658,418 A | * | 8/1997 | Coronel et al. ........ 156/345.25 |
| 5,841,571 A | | 11/1998 | Terahara ..................... 359/341 |
| 5,930,024 A | | 7/1999 | Atlas ........................... 359/279 |
| 5,963,567 A | | 10/1999 | Veselka et al. ................ 372/21 |
| 6,014,249 A | * | 1/2000 | Fermann et al. ......... 359/341.1 |
| 6,104,848 A | | 8/2000 | Toyohara et al. ............. 385/24 |
| 6,111,688 A | | 8/2000 | Kobayashi et al. .......... 359/341 |
| 6,160,657 A | | 12/2000 | Lee et al. .................... 359/334 |

(Continued)

FOREIGN PATENT DOCUMENTS

EP        0899867        3/1999

*Primary Examiner*—Don Wong
*Assistant Examiner*—Hung T. Vy (57) ABSTRACT

A number of embodiments provide multi-Wavelength Laser Source (MWLS) designs based on Super Continuum (SC) generation using Highly Non-Linear optical Fiber (HNLF). Advantageously, in some embodiments this technology only needs a single wavelength locking mechanism to tune and lock the whole set of channels to the ITU grid. Furthermore, in some embodiments, this laser system is able to provide wavelength channels in all the S, C and L bands. In this design, the optical signal provided by an initial seed laser source goes through a wavelength channel multiplier stage based on HNLF and is expanded in the frequency domain to cover a wider wavelength range. The wavelength channel multiplier consists of a number of optical fibers including various combinations of HNLF, single mode fiber and dispersion shifted fibers.

12 Claims, 9 Drawing Sheets

U.S. PATENT DOCUMENTS

| | | | |
|---|---|---|---|
| 6,163,553 A | 12/2000 | Pfeiffer | 372/6 |
| 6,195,369 B1 * | 2/2001 | Kumar et al. | 372/26 |
| 6,282,214 B1 | 8/2001 | Goto et al. | 372/20 |
| 6,298,187 B1 | 10/2001 | Waarts et al. | 385/37 |
| 6,307,984 B1 * | 10/2001 | Watanabe | 385/24 |
| 6,323,991 B2 | 11/2001 | Cisternino et al. | 359/329 |
| 6,341,025 B1 | 1/2002 | Mizrahi et al. | 359/130 |
| 6,341,034 B1 | 1/2002 | Sun et al. | 359/341.41 |
| 6,417,965 B1 | 7/2002 | Ye et al. | 359/341.41 |
| 6,433,306 B1 | 8/2002 | Grubb et al. | 219/121.73 |
| 6,504,973 B1 * | 1/2003 | DiGiovanni et al. | 385/27 |
| 6,522,818 B1 * | 2/2003 | Aso et al. | 385/122 |
| 6,590,910 B2 * | 7/2003 | Lin | 372/18 |
| 2001/0013965 A1 * | 8/2001 | Watanabe | 359/161 |
| 2002/0044752 A1 * | 4/2002 | Okuno et al. | 385/123 |
| 2002/0054613 A1 | 5/2002 | Kang | 372/6 |
| 2002/0071454 A1 * | 6/2002 | Lin | 372/6 |
| 2002/0176153 A1 | 11/2002 | Matsushita et al. | 359/333 |
| 2003/0035618 A1 * | 2/2003 | Watanabe | 385/24 |
| 2004/0057735 A1 * | 3/2004 | Uesaka | 398/201 |
| 2006/0002715 A1 * | 1/2006 | Igarashi et al. | 398/152 |

* cited by examiner

SYSTEM AND METHOD FOR GENERATING MULTI-WAVELENGTH LASER SOURCE USING HIGHLY NONLINEAR FIBER

RELATED APPLICATION

This application is a CIP of U.S. application Ser. No. 10/015,753 filed Dec. 17, 2001 now U.S. Pat. No. 6,826,207, hereby incorporated by reference in its entirety.

FIELD OF THE INVENTION

This invention generally relates to optical communication systems and more particularly optical laser sources with multiple lasing wavelengths.

BACKGROUND OF THE INVENTION

The huge bandwidth available in optical fiber in the low attenuation band is not accessible through electronic interfaces unless some type of multiplexing is used. Wavelength Division Multiplexing (WDM) offers the most efficient method to exploit the available bandwidth. In this technology, a number of parallel wavelength channels are used, where each channel carries up to a maximum data rate accessible through electronic interfaces. Moreover, the data protocols, framings and data rates used on different channels are totally independent of each other. As the technology progresses the number of feasible channels in the total band is increasing. The early WDM systems only used 4 to 16 channels while new systems are targeting higher number of channels, and are hence called Dense WDM (DWDM).

The low attenuation wavelength region is partitioned into smaller wavelength bands. The first band used in modern optical communications is called the Conventional Band or C-Band. This band included wavelength channels from 1520 to 1565 nm. Wavelengths covering 1565 to 1610 nm form the Long Band or L-Band, while 1475 to 1520 nm is called the Short Band or S-Band.

At the transmitter side of a DWDM system, a large number of different laser sources with different wavelengths are required. Each data stream is modulated on one of the wavelength channels and all the wavelength channels are multiplexed and sent to the same optical fiber. At the receiving end, each channel is demultiplexed from the set of wavelength channels. An optical receiver, then, will demodulate data from each channel. The capacity of a DWDM system increases as more wavelength channels are established. As a result, it would be desirable to increase the number of channels, decrease the channel spacing and increase the total wavelength window.

The DWDM systems now need a large number of laser sources as well as techniques to modulate a data signal on each source, combine, demultiplex and detect each data stream.

Currently, the laser sources designed into DWDM systems are exclusively of the single-wavelength variety. Distributed Feed-Back (DFB) lasers, Fabry-Perot lasers and ring lasers are some of the main technologies. Each wavelength supported in the system has a dedicated laser and its ancillary electronics. In the last few years and still today, the majority of lasers used are capable of emitting light only at a fixed wavelength. Increasingly, however, designs are making use of tunable wavelength lasers, which have broader spectral range and can operate at any point within that range. The key drawback of these devices however, is the sheer number that are required to satisfy the high channel count systems being proposed for the future optical network. At the same time, it is very important to be able to lock the center wavelength of each laser source to a specific wavelength. This is mainly because of the fact that if there is any drift in the wavelength of a laser, it can interfere with the adjacent wavelength channel communications. This imposes a practical limitation on the number of discrete laser sources that can be placed in a very tightly spaced wavelength channel system to realize a large number of channels. As a result, a multi-wavelength laser source that can provide an efficient and simple wavelength locking system is highly needed.

Although felt particularly acutely in the areas of system source architecture, the pressure to adapt to a high channel count reality is felt in other related areas. As increasingly tight channel spacings are supported for example, a new generation of instrumentation equipment is required to address the need for the characterization of performance and behavior with such fiber loads. This need extends the full length of the supply chain as component suppliers are required to quantify operation of advanced products during development and manufacturing, as system vendors develop, optimize, and validate equipment response to real-world scenarios, and as service providers qualify equipment and test out vendor claims.

SUMMARY OF THE INVENTION

In this invention, a multi-wavelength laser source that can simultaneously provide a number of wavelength channels is provided, which in some embodiments can address the requirement for the set of lasers at the DWDM transmitter.

A number of embodiments provide multi-Wavelength Laser Source (MWLS) designs based on Super Continuum (SC) generation using Highly Non-Linear optical Fiber (HNLF). Advantageously, in some embodiments this technology only needs a single wavelength locking mechanism to tune and lock the whole set of channels to the ITU grid. Furthermore, in some embodiments, this laser system is able to provide wavelength channels in all the S, C and L bands. In this design, the optical signal provided by an initial seed laser source goes through a wavelength channel multiplier stage based on HNLF and is expanded in the frequency domain to cover a wider wavelength range. The initial optical signal may be the optical beat signal of two DFB lasers tuned to different wavelengths relatively close to each other. Equivalently, a single laser source modulated by an RF source can provide the initial signal to the multiplier stage as well. The wavelength channel multiplier consists of a number of optical fibers including various combinations of HNLF, single mode fiber and dispersion shifted fibers. The multiplier stage uses optical fiber non-linear effects to expand the channel coverage of the initial optical signal. The channel spacing of the resulting channel set is mainly determined by the channel spacing of the initial optical signal, e.g. the wavelength difference of the two DFB lasers, the frequency of the RF source to modulate the single laser source. The MWLS introduced in this invention, can cover different low attenuation bands in the optical fiber, such as C, L, S or contiguous combinations of them.

According to one broad aspect, the invention provides a nonlinear medium comprising a first segment of HNLF (highly nonlinear fiber), a segment of single mode fiber and a second segment of HNLF connected together in sequence.

According to another broad aspect, the invention provides a multi-wavelength laser source comprising: a source of an optical signal having optical pulses at a channel spacing frequency; an amplifier for amplifying the optical signal to produce an amplified optical signal; a nonlinear medium summarized above connected to receive the amplified optical signal, and to yield comblike multi-channel WDM laser signals separated from each other by said channel spacing frequency.

In some embodiments, the source comprises: a first monochromatic laser generating a first output signal having a first ($f_1$) lasing frequency; a second monochromatic laser generating a second output signal having a second ($f_2$) lasing frequency, the second lasing frequency differing from the first lasing frequency by said channel spacing frequency; a combiner for combining the first output signal with the second output signal to generate the optical signal.

In some embodiments, the source comprises: a first monochromatic laser generating a first output signal having a first ($f_1$) lasing frequency; a modulator adapted to modulate the first output signal to generate said optical signal.

In some embodiments, the HNLF has a dispersion zero at 1542 nm±3 nm and a dispersion slope of $S_D \leq 0.04$ ps/Km·nm$^2$ with effective mode area $A_{eff} \leq 20$ µm$^2$, and wherein the first segment of HNLF is from 150 to 250 m long, the second segment of HNLF is from 250 to 350 m long, and the segment of SMF is 50 to 120 m long.

In some embodiments, the HNLF has a dispersion slope of about $S_D=0.031$ ps/Km·nm$^2$ with effective mode area about $A_{eff}=10$ µm$^2$ and wherein the first segment of HNLF is about 190 m long, the second segment of HNLF is about 288 m long, and the segment of SMF is about 80 m long.

In some embodiments, the two monochromatic lasers are tuned to 1546.119 nm and 1546.916 nm respectively, and the HNLF has a dispersion slope of about $S_D=0.031$ ps/Km·nm$^2$ with effective mode area about $A_{eff}=10$ µm$^2$ and wherein the first segment of HNLF is about 190 m long, the second segment of HNLF is about 288 m long, and the segment of SMF is about 80 m long.

In some embodiments, the two monochromatic lasers comprise two DFB lasers tuned to 1503.472 nm and 1504.227 nm respectively, and HNLF has a dispersion zero at 1508 nm±3 nm, and wherein the first segment of HNLF is from 250–800 m long, the segment of SMF is from 50–120 m long, and the second segment of HNLF is from 400–750 m long.

In some embodiments, the first segment of HNLF is about 400 m long, the segment of SMF is about 80 m long, and the second segment of HNLF is about 500 m long. This design is appropriate for covering the combined S and C bands but is not necessarily limited to that application.

In some embodiments, the first segment of HNLF is about 190 m long, the segment of SMF is about 70 m long, and the second segment of HNLF is about 288 m long.

In some embodiments, the multi-wavelength source adapts for 50 GHz channel spacing, wherein the two monochromatic lasers comprise two DFB lasers tuned at a 50 GHz channel spacing to 1546.119 nm and 1546.517 nm, and wherein the first segment of HNLF is from 120 m to 250 m long, the segment of SMF is from 250 m to 400 m long, and the second segment of HNLF is longer than 250 m. This design is appropriate for covering the C band but is not necessarily limited to that application.

In some embodiments, the first segment of HNLF is about 190 m long, the segment of SMF is about 350 m long, and the second segment of HNLF is about 288 m long.

In some embodiments, the multi-wavelength source adapts for 50 GHz channel spacing, wherein the two monochromatic lasers comprise two DFB lasers tuned at a 50 GHz channel spacing to 1560.606 nm and 1561.419 nm, and wherein the first segment of HNLF is from 300 m to 600 m long, the segment of SMF is from 50 m to 120 m long, and the second segment of HNLF is from 450 m to 700 m long.

In some embodiments, the first segment of HNLF is about 400 m long, the segment of SMF is about 80 m long, and the second segment of HNLF is about 500 m long.

According to another broad aspect, the invention provides a nonlinear medium comprising a first segment of DSF of a first type, a second segment of DSF of a second type, a segment of SMF, and a segment of HNLF connected together in sequence.

According to another broad aspect, the invention provides a multi-wavelength laser source comprising: a source of an optical signal having optical pulses at a channel spacing frequency; an amplifier for amplifying the optical signal to produce an amplified optical signal; a nonlinear medium as summarized above connected to receive the amplified optical signal, and to yield comblike multi-channel WDM laser signals separated from each other by said channel spacing frequency.

In some embodiments, the segment of DSF of the first type is from 300 to 600 m long, the segment of DSF of the second type is from 300 to 600 m long, the segment of SMF is from 50 to 120 m long, and the segment of HNLF is from 250 to 350 m long, and the HNLF has a dispersion zero at 1542 nm±3 nm and a dispersion slope is $S_D \leq 0.04$ ps/Km·nm$^2$ with effective mode area $A_{eff} \leq 20$ µm$^2$.

In some embodiments, the segment of DSF of the first type is about 400 m long, the segment of DSF of the second type is about 400 m long, the segment of SMF is about 80 m long, and the segment of HNLF is about 288 m long, and the HNLF has a dispersion zero at 1542 nm and a dispersion slope is about $S_D=0.031$ ps/Km·nm$^2$ with effective mode area about $A_{eff}=10$ µm$^2$. This design is appropriate for covering the C band but is not necessarily limited to that application.

In some embodiments, the segment of DSF of the first type is about 800 m long, the segment of DSF of the second type is about 800 m long, the segment of SMF is about 70 m long, and the segment of HNLF is about 288 m long.

According to another broad aspect, the invention provides a nonlinear medium comprising a first segment of DSF, a segment of SMF, a second segment of DSF and a segment of HNLF.

According to another broad aspect, the invention provides a multi-wavelength laser source comprising: a source of an optical signal having optical pulses at a channel spacing frequency; an amplifier for amplifying the optical signal to produce an amplified optical signal; a nonlinear medium as summarized above connected to receive the amplified optical signal, and to yield comblike multi-channel WDM laser signals separated from each other by said channel spacing frequency.

According to another broad aspect, the invention provides a nonlinear medium comprising a segment of HNLF, a segment of SMF, a first segment of DSF of a first type, a second type of DSF of a second type connected together in sequence.

According to another broad aspect, the invention provides a multi-wavelength laser source comprising: a source of an optical signal having optical pulses at a channel spacing frequency; an amplifier for amplifying the optical signal to produce an amplified optical signal; a nonlinear medium as summarized above connected to receive the amplified optical signal, and to yield comblike multi-channel WDM laser signals separated from each other by said channel spacing frequency.

In some embodiments, the source comprises: a first monochromatic laser generating a first output signal having a first ($f_1$) lasing frequency; a second monochromatic laser generating a second output signal having a second ($f_2$) lasing frequency, the second lasing frequency differing from the first lasing frequency by said channel spacing frequency; a combiner for combining the first output signal with the second output signal to generate the optical signal.

In some embodiments, the source comprises: a first monochromatic laser generating a first output signal having a first ($f_1$) lasing frequency; a modulator adapted to modulate the first output signal to generate said optical signal.

In some embodiments, the multi-wavelength source the segment of HNLF is from 150 to 300 m long, the segment of SMF is from 50 to 120 m long, and the segment of DSF of the first type is from 300 to 700 m long, and the segment of DSF of the second type is from 200 to 600 m long.

In some embodiments, the multi-wavelength source the segment of HNLF is about 190 m long, the segment of SMF is about 80 m long, and the segment of DSF of the first type is about 400 m long, and the segment of DSF of the second type is about 300 m long.

In some embodiments, the multi-wavelength source the segment of HNLF is about 199 m long, the segment of SMF is about 70 m long, and the segment of DSF of the first type is about 500 m long, and the segment of DSF of the second type is about 400 m long.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In this invention, a Multi-Wavelength Laser Source (MWLS) system using a wavelength channel multiplier based on Highly Non-Linear optical Fiber (HNLF) is provided.

Figure 1A:
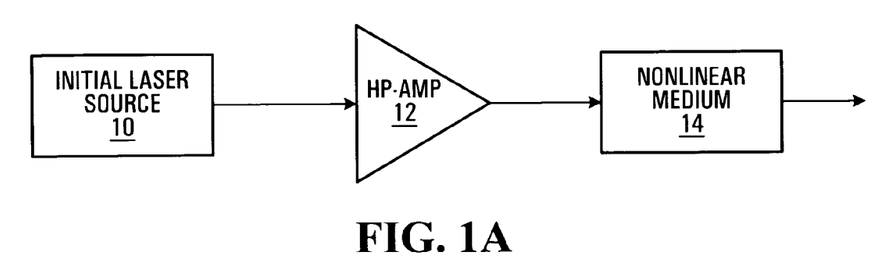
FIG. 1A is a block diagram of a multi-wavelength laser Source provided by an embodiment of the invention.

The typical block diagram of this invention is presented in FIG. 1A. As shown in the figure, a High Power Optical Amplifier (HP-Amp) 12 boosts an optical signal generated by an initial laser source 10. The resulting optical signal, then propagates through a nonlinear medium 14, such as optical fiber and more specifically an HNLF. Nonlinear effects, which may include a combination of one or more of self-phase modulation (SPM), cross phase modulation (XPM) and Four-wave mixing (FWM) change the spectrum of the initial signal. The frequency coverage and profile of the resulting signal spectrum mainly depends on the non-linear and dispersion characteristics of the nonlinear medium 14. In order to produce a Multi-Wavelength Laser Source (MWLS), the nonlinear medium 14 is designed and optimized to broaden the spectrum to cover a target band, such as the C-Band, L-Band, S-Band or any contiguous combination of those or some other band.

Figure 1B:
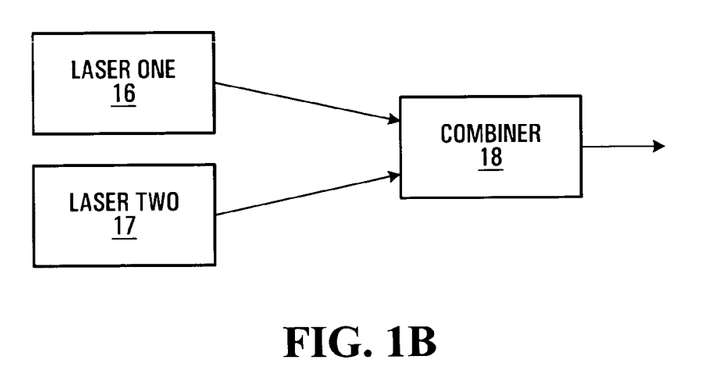
FIGS. 1B and 1C are block diagrams of two possible initial laser sources.

In preferred embodiments, the initial optical signal is a pulse train with relatively short pulses. The repetition rate of this pulse train determines the spacing of the wavelength channels set in the MWLS. In one embodiment, the initial laser source is as shown in the block diagram of FIG. 1B. Two lasers, preferably DFB lasers 16, 17 are tuned to different wavelengths relatively close to each other and are coupled into combiner 18. The two lasers 16, 17 have different frequencies, and the channel spacing between two adjacent channels generated by the system FIG. 1A is dictated by the spacing of the two lasers. In this embodiment, the nonlinear medium 14 is designed to expand the two initial wavelength channels to cover a wide band, such as the C, L, S band or combination of these bands or some other band.

Figure 1C:
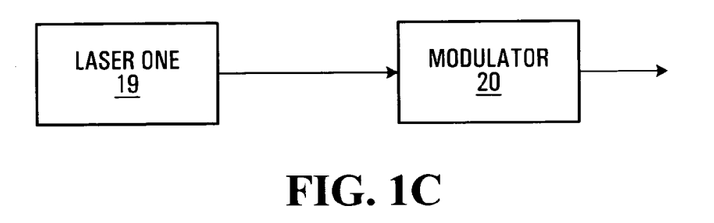

In another embodiment of the invention, the laser source is as shown in FIG. 1C. Here, there is a single laser 19 which is modulated by modulator 20 to provide the required train of optical pulses. In this case, the frequency of the modulator 20 determines the channel spacing of the resulting wavelength set. It is noted that the modulation could be AM, FM, phase modulation, etc.

An immediate advantage of the MWLS presented in here is that a good locking technique on the initial laser signal insures wavelength locking in the whole set of output channels. Tuning of the whole resulting set of channels to the ITU grid, for example, is also based on the initial wavelength channels of the initial set, e.g. the wavelengths of two DFB lasers. As a result, this MWLS design simplifies the wavelength tuning and locking which otherwise needed to be done on each individual lasers. If the case of a few hundred channels, the benefits of the central tuning and locking provided in this invention can be easily seen.

Various detailed embodiments are now described which feature the nonlinear medium 14 being composed of various combinations of HNLF, SMF and DSF. For each example, simulation and experimental results are presented. These limited sets of examples clearly show the flexibility of the design to cover different wavelength bands based on an initial optical signal created by the beating of two DFB lasers. These lasers are, for example, selected to be 100 GHz apart to create a multi-wavelength laser source with 100 GHz channel spacing. Similarly for an MWLS with 50 GHz channel spacing one needs to space them at 50 GHz. Other sources such as a single laser source modulated by an RF signal or a mode locked laser that can provide very short optical pulses can also be used.

The laser pulse propagation in the optical fiber is governed by the nonlinear Schrodinger equation $$\frac{\partial E(z,t)}{\partial z} = [\hat{D} + \hat{N}] \cdot E(z,t),$$

where E(z,t) denotes the electrical field of the light wave. The non-linearity is shown by $\hat{N}$ operator, which depends on the nonlinear index and represents photon elastic and inelastic scattering processes, such as, Rayleigh and Raman scattering in the fiber. $\hat{D}$ is the dispersion operator, which relates to the dispersion parameter of the fiber. This equation includes nonlinear process such as SPM, XPM, FWM, Raman effects, the first and second order of group-velocity dispersion (GVD) and attenuation of fiber.

To simplify the discussion, the nonlinear operator can be written without Raman effect as $$\hat{N} = -j\gamma |E(z,t)|^2,$$

where $\gamma$ is fiber nonlinear parameter;

$$\gamma = \frac{2\pi n_2}{c A_{\mathit{eff}}} f,$$

and $n_2$ is fiber nonlinear index. Because of the small core of HNLF fiber, i.e. very small Aeff, $\gamma$ is a big number and consequently $\hat{N}$ is large. As a result, the fiber shows higher nonlinear effects. Since HNLF is a Dispersion Shifted Fiber with strong non-linear effects, it is also called Highly Non-linear Dispersion Shifted Fiber (HN-DSF).

Pulse compression and spectrum broadening can be described as following. The beat signal (or the optical pulse train) is compressed into a soliton pulse train in the fore part of fiber and also is chirped. In SMF fiber pulse train is compressed further due to its GVD effects. In the rear part of fiber, FWM and SPM play an important role to extend the side mode energy to cover a bright wide band. Due to highly nonlinear effects in HNLF, the spectra can be extended to very wide ranges, such as 100 nm. As a result, combined wavelength bands, for example C+L Band or S+C Band, can be covered by this method. On the other hand, having a small dispersion slope in the HNLF makes it easy for the side modes to find their partners in order to match the condition of FWM, thus enhance FWM. This also results in increasing the length of longitudinal modes.

In all the designs presented in here, HNLF plays a critical role in the generation and expansion of the multi-wavelength laser sources. In a preferred implementation, the effective mode area of core in the HNL, DSF and SMF is $A_{\mathit{eff}}=10\ \mu m^2$ (preferred range: $A_{\mathit{eff}} \leq 20\ \mu m^2$), 60 $\mu m^2$ and 80 $\mu m^2$ respectively. In a preferred implementation, the dispersion slope of HNLF $S_D=0.031$ ps/Km·nm² (preferred range: $S_D \leq 0.04$ ps/km·nm²) is also smaller than $S_D=0.068$ ps/Km·nm² (preferred range: $0.06 \leq S_D \leq 0.04$ ps/km.nm²) for DSF and $S_D=0.079$ ps/Km·nm² (preferred range: $0.07 \leq S_D \leq 0.09$ ps/km·nm²) for SMF. This small core area and slope dramatically increases nonlinear effects of the medium, which in turn enhances the wavelength coverage. Two types of DSF are used in the following specific examples, which are DSF I with dispersion slope of $S_D=0.068$ ps/Km·nm² (preferred range: $0.06 \leq S_D \leq 0.09$ ps/km·nm²) and zero dispersion wavelength of $\lambda_0=1552.4$ nm (preferred range: ±3 nm); and DSF II with dispersion slope of $S_D=0.068$ ps/Km·nm² (preferred range: $0.06 \leq S_D \leq 0.09$ ps/km·nm²) and zero dispersion wavelength of $\lambda_0=1541.2$ nm (preferred range: ±3 nm).

Figure 2:
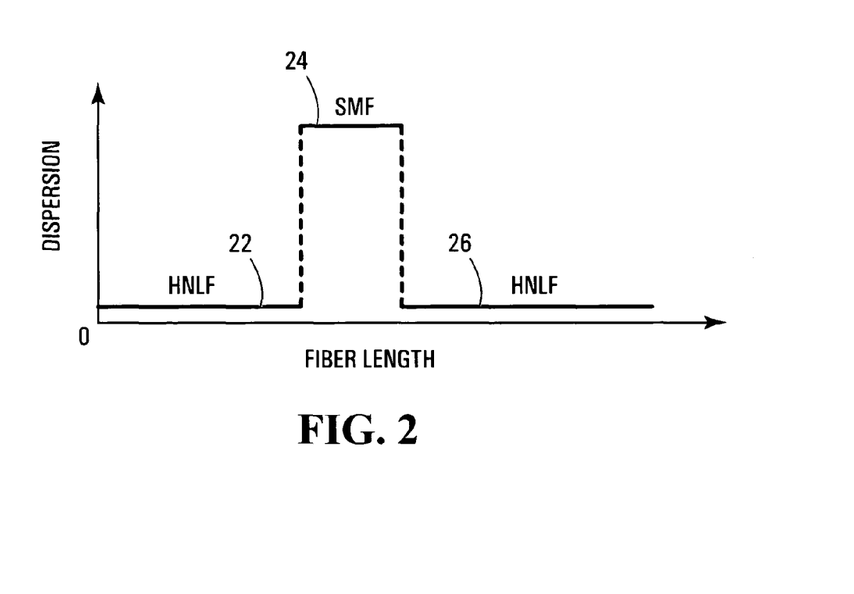
FIG. 2 presents an example fiber dispersion profile of a first fiber combination with highly nonlinear fiber and single mode fiber.

In a first embodiment for which the dispersion profile is shown in FIG. 2, the nonlinear medium 14 consists of a first segment of HNLF 22, a segment of SMF 24 and a second segment of HNLF 26. For the purpose of the simulation results, the two DFB lasers are tuned to 1546.119 nm and 1546.916 nm. HNLF has dispersion zero at 1542 nm (±3 nm) and its dispersion slope is $S_D=0.031$ ps/Km·nm$^2$ with effective mode area $A_{eff}=10$ μm$^2$. The length of the first piece of HNLF is 190 m (preferred range: 150–250 m) and the second piece is 288 m (preferred range: 250–350 m). The length of SMF in the middle is 80 m (preferred range 50–120 m).

Figure 3:
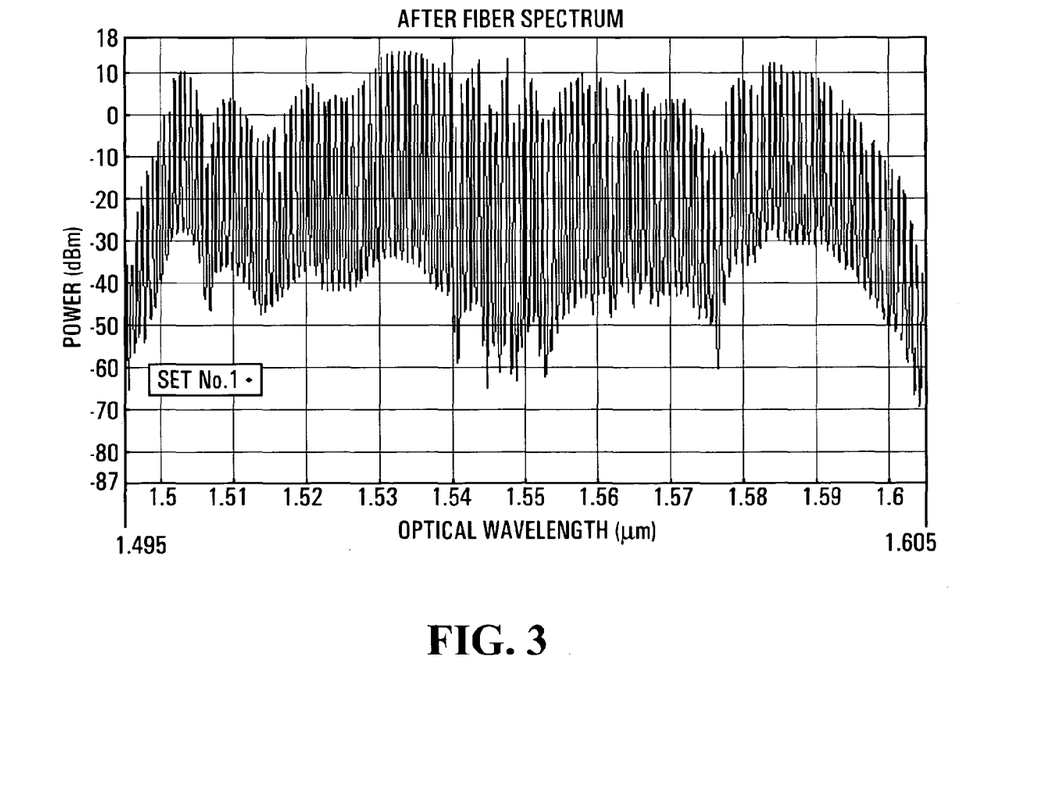
FIG. 3 presents simulation results for the combination shown in FIG. 2.

This system can cover C-band, L-band and part of S-Band. The simulation result is shown in FIG. 3.

Figure 4:
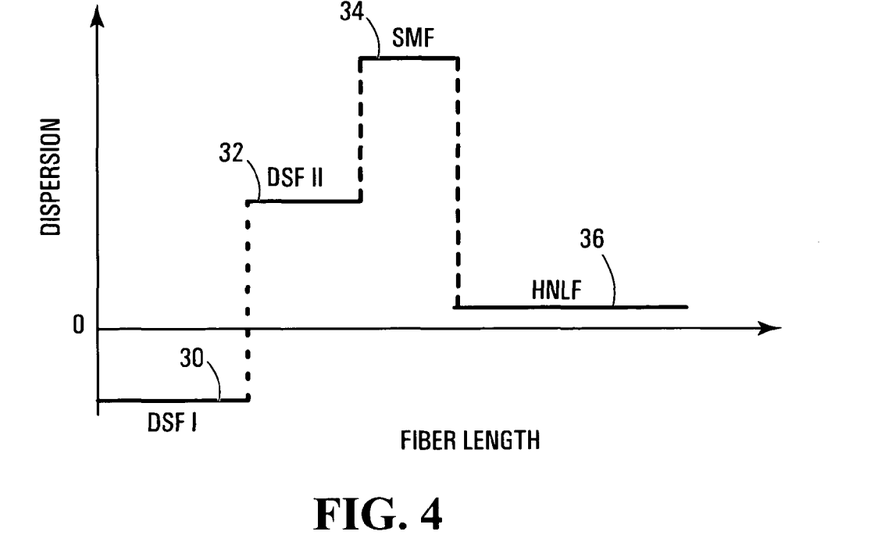
FIG. 4 presents an example fiber dispersion profile of a second fiber combination consisting of HNLF, two types of DSF, (DSF I and DSFII), and SMF.

In another embodiment for which the dispersion profile is shown in FIG. 4, the nonlinear medium 14 of FIG. 1A consists of a first segment of DSF 30 of a first type, a segment of DSF of a second type 32, a segment of SMF 34, followed by a segment of HNLF 36, all connected in sequence. For the purpose of simulation, the two types of DSF namely DSF I and DSF II are 400 m each (preferred range: 300–600 m), the SMF segment is 80 m (preferred range: 50–120 m) and the HNLF is 288 m (preferred range: 250–350 m) with the same characteristics of HNLF in the first combination.

Figure 5:
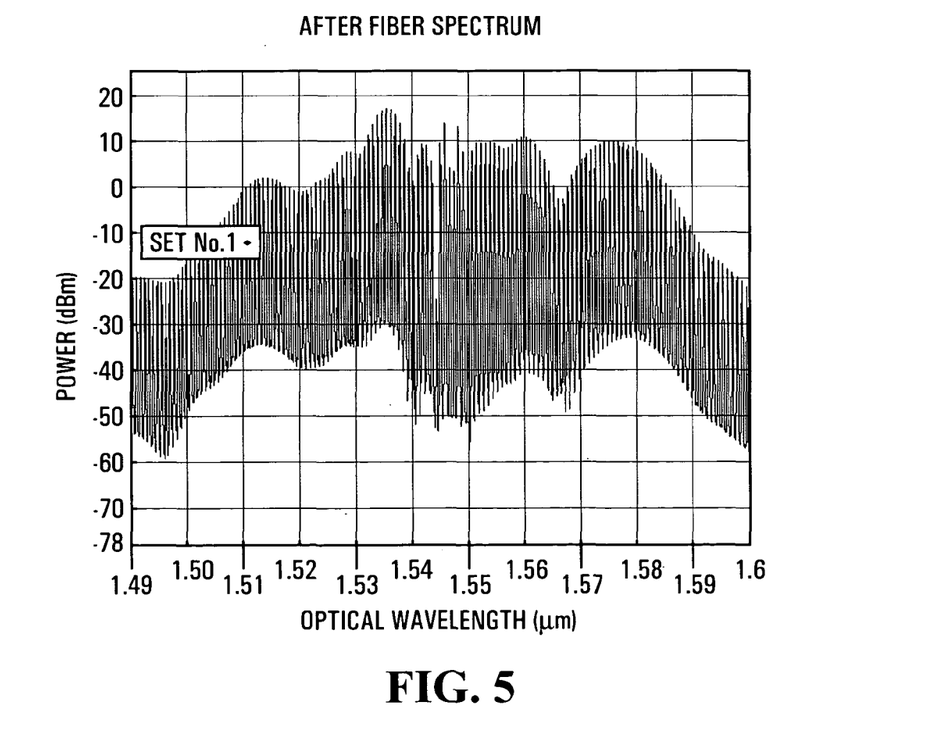
FIG. 5 presents simulation results for the combination of FIG. 4.

This system, however, is designed to cover only C-Band. The simulation result is presented in FIG. 5.

Figure 6:
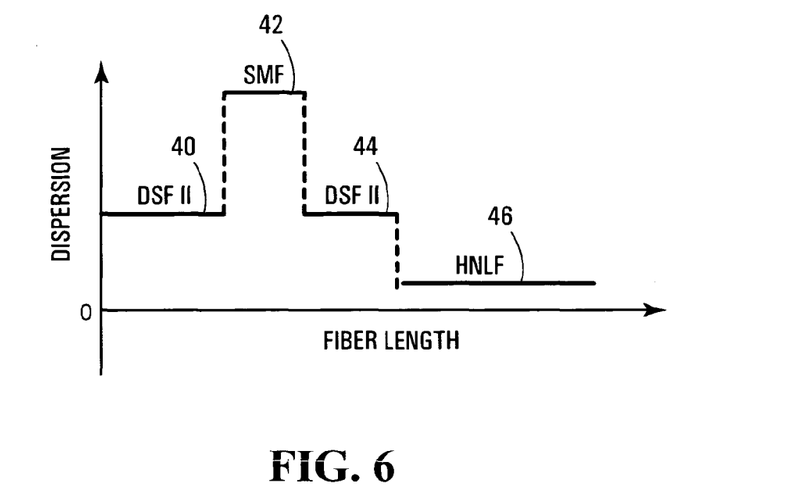
FIG. 6 presents an example fiber dispersion profile of a third fiber combination consisting of DSF, SMF and HNLF.
Figure 7:
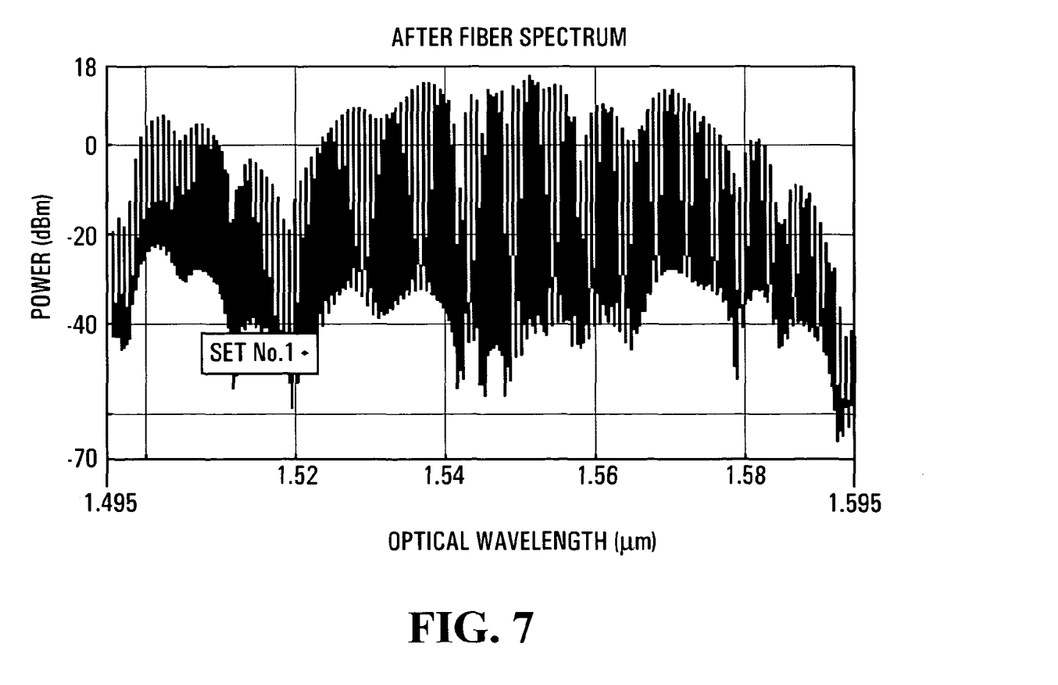
FIG. 7 presents simulation results for the fiber combination of FIG. 6.

In another embodiment for which the dispersion profile is shown in FIG. 6, the nonlinear medium 14 of FIG. 1A consists of a segment 40 of the second type of DSF, a segment of SMF 43, another segment of DSF II 44, a segment of HNLF 46 targeted at C-Band coverage. The coverage and response of this combination is shown in FIG. 7.

Figure 8:
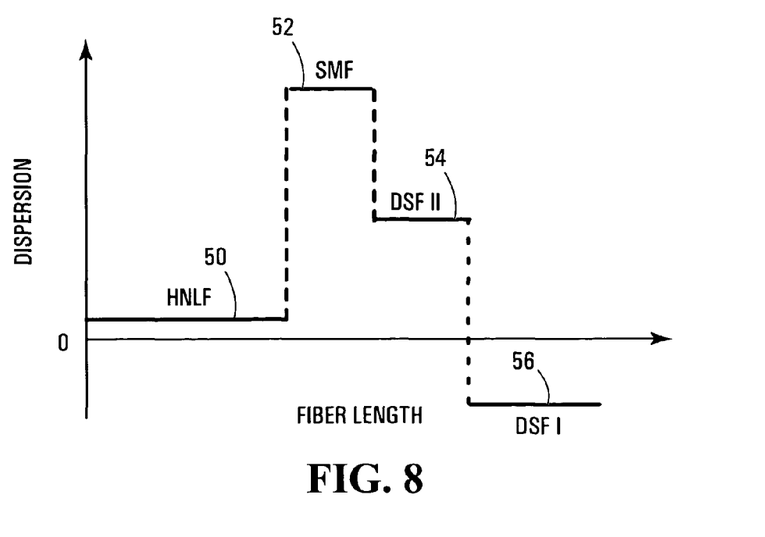
FIG. 8 presents an example fiber dispersion profile of a fourth fiber combination using HNLF, SMF, DSF I and DSF II to cover C-Band.
Figure 9:
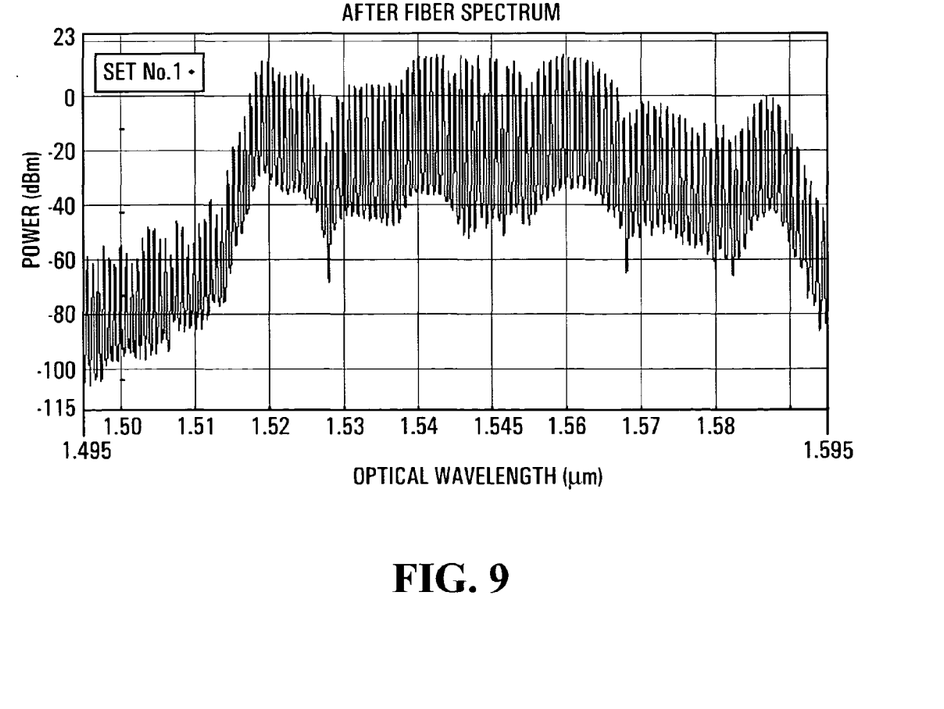
FIG. 9 presents simulation results for the fiber combination in FIG. 8.

In another embodiment for which the dispersion profile is shown in FIG. 8, the nonlinear medium 14 of FIG. 1A consists of a segment of HNLF 50, a segment of SMF 52, a segment of DSF of a second type 54, and a segment of DSF of a first type 56. For the purpose of simulation, C-Band coverage is the target for the design shown in FIG. 8. In this design, 190 m of HNLF (preferred range: 150–300 m), 80 m of SMF (preferred range: 50–120 m), 400 m of DSF I (preferred range: 300–700 m) and 300 m of DSF II (preferred range: 200–600 m) are used. The simulation result shown in FIG. 9 verifies the design.

Figure 10:
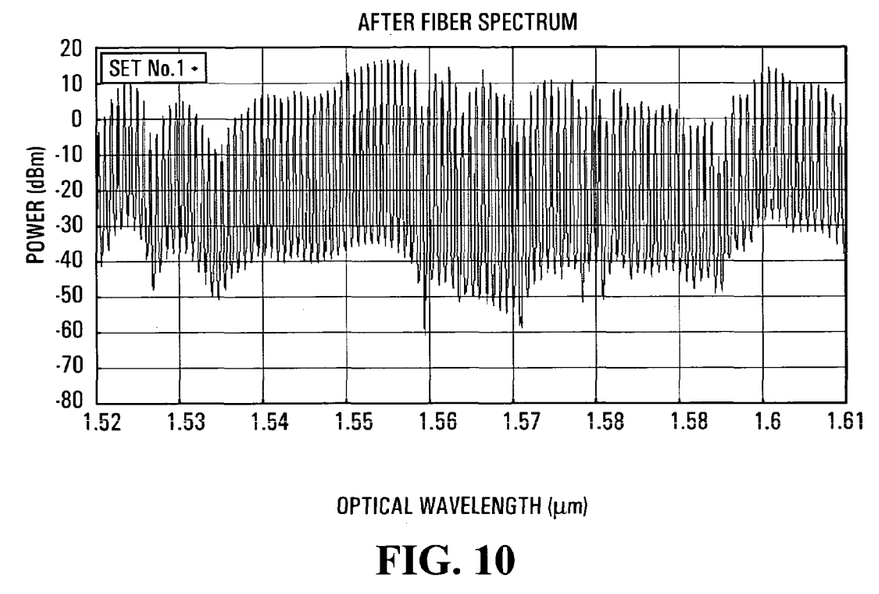
FIG. 10 presents simulation results for a design based on the fiber combination of FIG. 2 targeted at C+L-band coverage.

For the first fiber combination of FIG. 2, the C and L bands can be covered by changing some of the design parameters. The two initial DFB lasers are tuned to 1560.606 nm and 1561.419 nm. Then zero dispersion wavelength of the HNLF is shifted to 1564 nm±3 nm. In this new design the length of the first HNLF is 400 m (preferred range: 300–600 m), SMF is at 80 m (preferred range: 50–120 m) and 500 m of HNLF (preferred range: 450–700 m) is used for the last piece. The simulation result of this combination is shown in FIG. 10.

Figure 11:
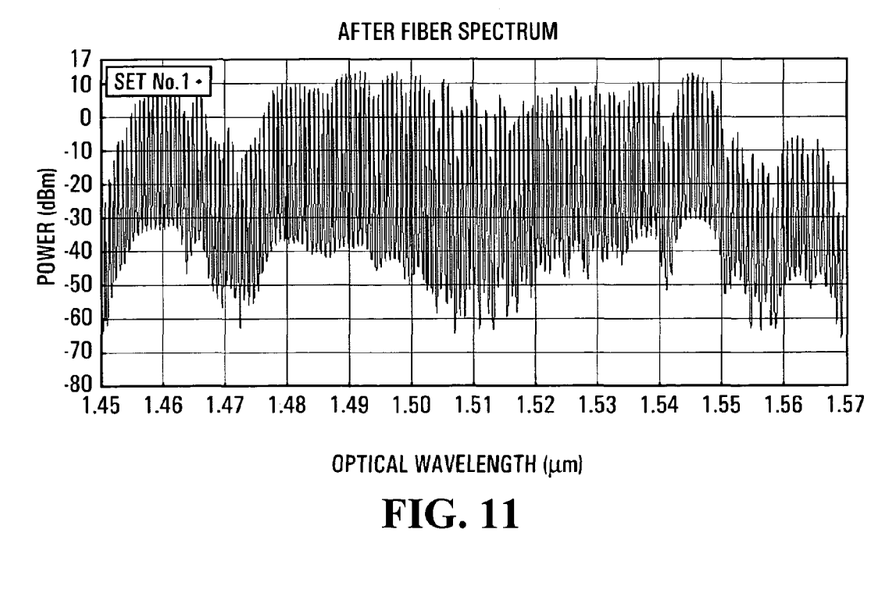
FIG. 11 presents simulation results for a fiber combination similar to the one shown in FIG. 2 but tailored to S+C-band coverage.

The fiber combination of FIG. 2 can also be adjusted to cover S+C band. In this case, the initial DFB lasers is tuned to 1503.472 nm and 1504.227 nm. The zero dispersion wavelength of the HNLF is at 1508 nm±3 nm. For the fiber lengths, 400 m of HNLF (preferred range: 250–800 m) followed by 80 m of SMF (preferred range: 50–120 m) and another 500 m of HNLF (preferred range: 400–750 m) are used. The simulation result shown in FIG. 11 verified the design.

Figure 12:
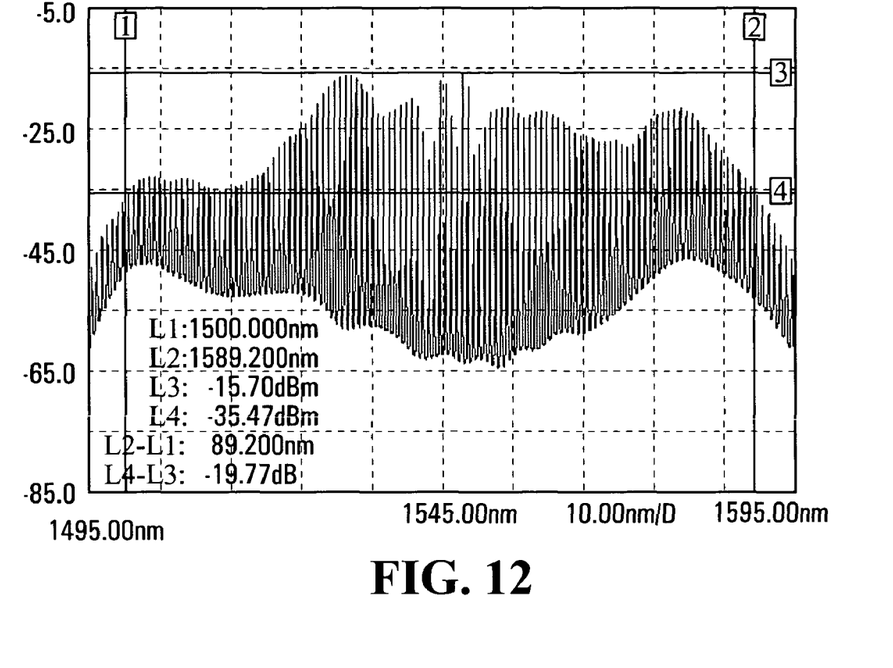
FIG. 12 presents experimental results for a design based on the fiber combination of FIG. 2.

FIG. 12 shows experimental results for a design based on the fiber combination of FIG. 2. This design consists of 190 m HNLF, 70 m SMF and another 288 m of HNLF.

Figure 13:
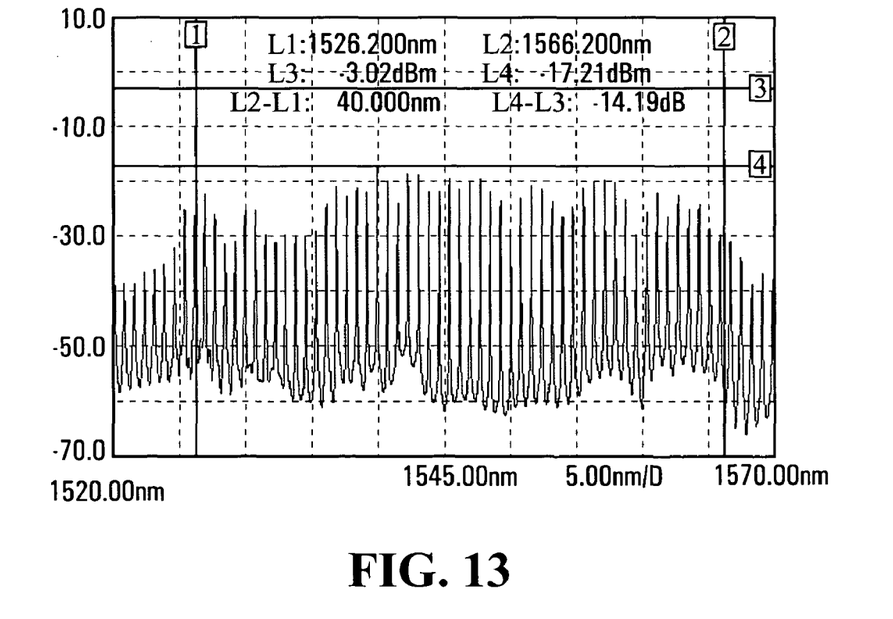
FIG. 13 presents experimental results for a designed based on the fiber combination of FIG. 4.

FIG. 13 represents the experimental results for a fiber combination similar to the one shown in FIG. 4. In this design, 800 m of DSF I, 70 m of SMF and 800 m of DSF II, and 288 m of HNLF are used.

Figure 14:
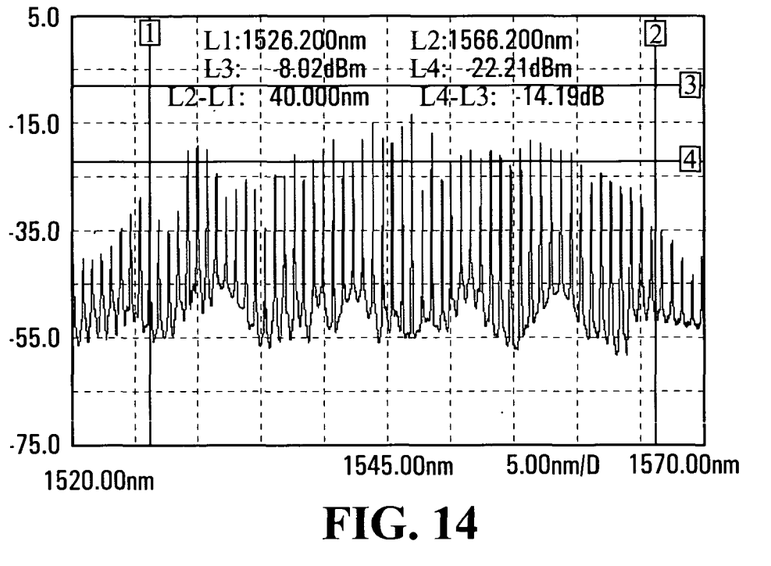
FIG. 14 presents experimental results for a design based on the fiber combination of FIG. 8.

A design based on the fiber combination of FIG. 8 has been tested in the lab, where 199 m of HNLF, 70 m of SMF, 500 m of DSF I and 400 m of DSF II are put together. The experimental result is presented in FIG. 14.

Figure 15:
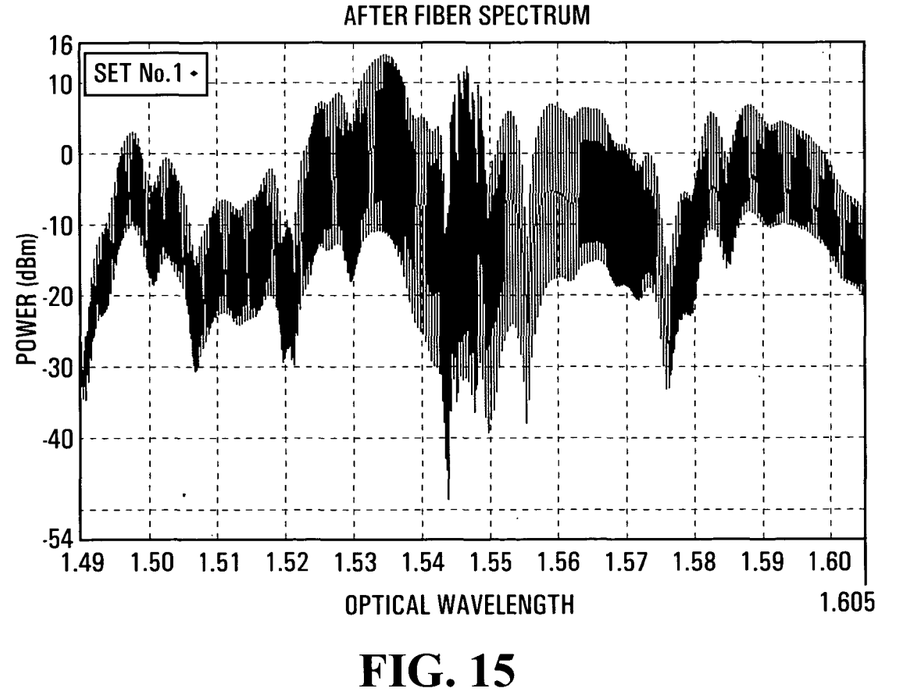
FIG. 15 presents simulation results based on the design of the fiber combination of FIG. 2 for 50 GHz channel spacing.
Figure 16:
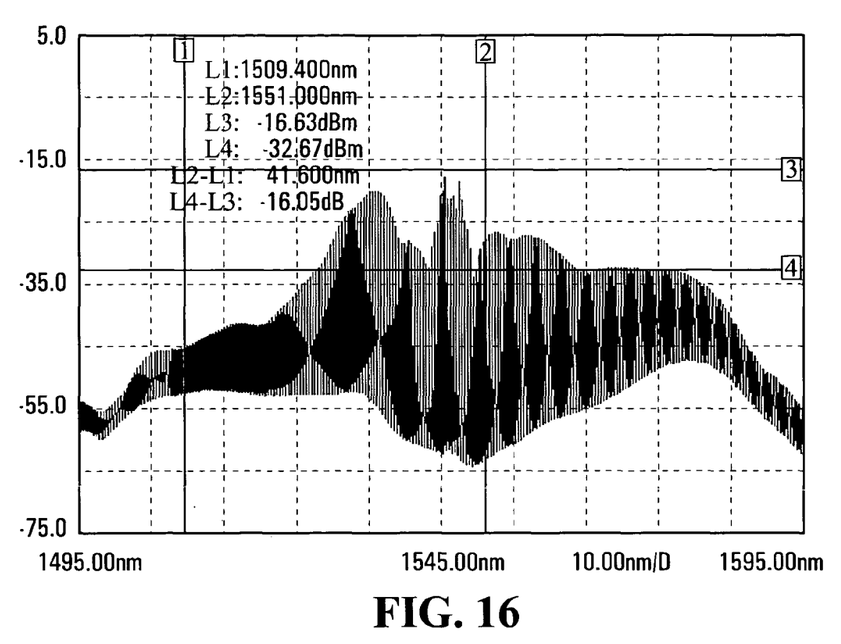
FIG. 16 presents experimental results for a fiber combination similar to FIG. 2 for 50 GHz channel spacing.
Figure 17:
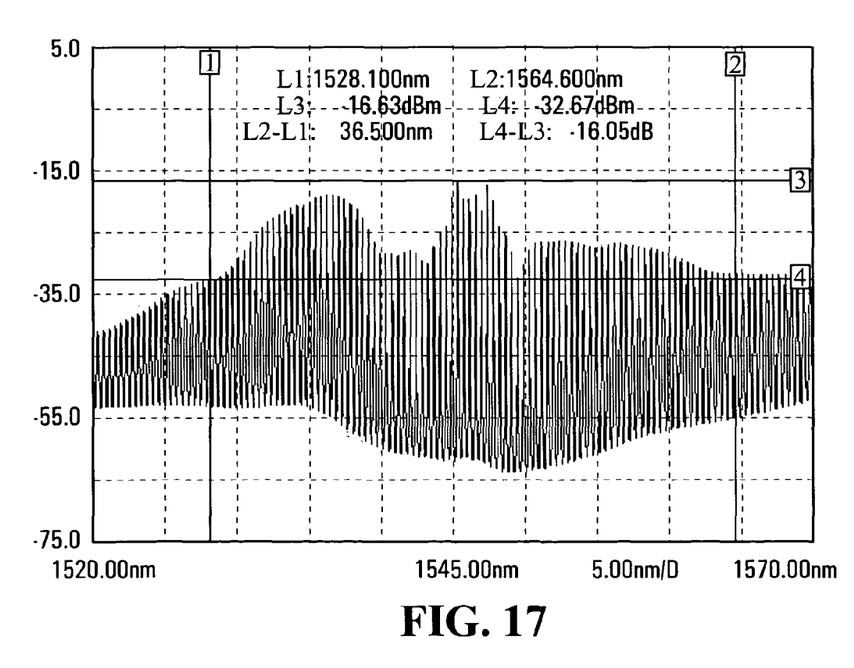
FIG. 17 presents the C-band part of the spectrum shown in FIG. 16.

Finally, FIGS. 15 and 16 show the simulation and experimental results, respectively, for a system that has 50 GHz channel spacing. The initial two DFB lasers are tuned at a 50 GHz channel spacing to 1546.119 nm and 1546.517 nm. The fiber combination of FIG. 2 with 190 m of HNLF (preferred range: 120–250 m), 350 m of SMF (preferred range: 250–400 m) followed by another 288 m HNLF (preferred range:>250) is used in this design. FIG. 17 is the magnified view of the C-Band part of FIG. 16.

Numerous modifications and variations of the present invention are possible in light of the above teachings. It is therefore to be understood that within the scope of the appended claims, the invention may be practiced otherwise than as specifically described herein.

The invention claimed is:

1. A multi-wavelength laser source comprising;
   a source of an optical signal having optical pulses at a channel spacing frequency;
   an amplifier for amplifying the optical signal to produce an amplified optical signal;
   a nonlinear medium comprising multiple segments of optic fiber, at least one of the segments comprising HNLF (highly nonlinear fiber), the nonlinear medium connected to receive the amplified, optical signal, and to yield comblike multi-channel WDM laser signals separated from each other by said channel spacing frequency;
   wherein the nonlinear medium comprises a first segment of DSF of a first type, a second segment of DSF of a second type, a segment of SMF, and a segment of HNLF connected together in sequence.

2. A multi-wavelength laser source according to claim 1 wherein the source comprises:
   a first monochromatic laser generating a first output signal having a first ($f_1$) lasing frequency;
   a second monochromatic laser generating a second output signal having a second ($f_2$) lasing frequency, the second lasing frequency differing from the first lasing frequency by said channel spacing frequency;
   a combiner for combining the first output signal with the second output signal to generate the optical signal.

3. A multi-wavelength laser source according to claim 1 wherein the source comprises:
   a first monochromatic laser generating a first output signal having a first ($f_1$) lasing frequency;
   a modulator adapted to modulate the first output signal to generate said optical signal.

4. A multi-wavelength source according to claim 1 wherein the segment of DSF of the first type is from 300 to 600 m long, the segment of DSF of the second type is from 300 to 600 m long, the segment of SMF is from 50 to 120 m long, and the segment of HNLF is from 250 to 350 m long, and the HNLF has a dispersion zero at 1542 nm±3 nm and a dispersion slope is $S_D \leq 0.04$ ps/Km·nm² with effective mode area $A_{eff} \leq 20$ μm².

5. A multi-wavelength source according to claim 4 wherein the segment of DSF of the first type is about 400 m long, the segment of DSF of the second type is about 400m long, the segment of SMF is about 80 m long, and the segment of HNLF is about 288 m long, and the HNLF has a dispersion zero at 1542 nm and a dispersion slope is about $S_D = 0.031$ ps/Km·nm² with effective mode area about $A_{eff} = 10$ μm².

6. A multi-wavelength source according to claim 4 wherein the segment of DSF of the first type is about 800 m long, the segment of DSF of the second type is about 800 m long, the segment of SMF is about 70 m long, and the segment of HNLF is about 288 m long.

7. A multi-wavelength laser source comprising:
   a source of an optical signal having optical pulses at a channel spacing frequency;
   an amplifier for amplifying the optical signal to produce an amplified optical signal;
   a nonlinear medium comprising multiple segments of optic fiber, at least one of the segments comprising HNLF (highly nonlinear fiber), the nonlinear medium connected to receive the amplified optical signal, and to yield comblike multi-channel WDM laser signals separated from each other by said channel spacing frequency;
   wherein the nonlinear medium comprises a segment of HNLF, a segment of SMF, a first segment of DSF of a first type, a second type of DSF of a second type connected together in sequence.

8. A multi-wavelength laser source according to claim 7 wherein the source comprises:
   a first monochromatic laser generating a first output signal having a first ($f_1$) lasing frequency;
   a second monochromatic laser generating a second output signal having a second ($f_2$) lasing frequency, the second lasing frequency differing from the first lasing frequency by said channel spacing frequency;
   a combiner for combining the first output signal with the second output signal to generate the optical signal.

9. A multi-wavelength laser source according to claim 7 wherein the source comprises:
   a first monochromatic laser generating a first output signal having a first ($f_1$) lasing frequency;
   a modulator adapted to modulate the first output signal to generate said optical signal.

10. A multi-wavelength source according to claim 7 the segment of HNLF is from 150 to 300 m long, the segment of SMF is from 50 to 120 m long, and the segment of DSF of the first type is from 300 to 700 m long, and the segment of DSF of the second type is from 200 to 600 m long.

11. A multi-wavelength source according to claim 10 the segment of HNLF is about 190 m long, the segment of SMF is about 80 m long, and the segment of DSF of the first type is about 400 m long, and the segment of DSF of the second type is about 300 m long.

12. A multi-wavelength source according to claim 7 the segment of HNLF is about 199 m long, the segment of SMF is about 70 m long, and the segment of DSF of the first type is about 500 m long, and the segment of DSF of the second type is about 400 m long.

* * * * *